United States Patent [19]

Baker et al.

[11] 3,735,037

[45] May 22, 1973

[54] TELEVISION DEMODULATOR WITH SHORT AND LONG TIME CONSTANTS

[75] Inventors: Henry Louis Baker, Northwood Hills; Kenneth Charles Quinton, Esher; Daniel Henry Smart, Morden, all of England

[73] Assignee: Communications Patents Limited, London, England

[22] Filed: Aug. 20, 1971

[21] Appl. No.: 173,389

[30] Foreign Application Priority Data

Aug. 28, 1970 Great Britain....................41,536/70

[52] U.S. Cl. ..........178/7.3 R, 178/7.5 DC, 329/111, 329/146, 329/147

[51] Int. Cl. ..............................................H04n 5/44

[58] Field of Search......................329/111, 146, 147, 329/150, 1; 325/364, 398; 178/7.5 DC, 7.3 R, 7.3 DC

[56] References Cited

UNITED STATES PATENTS

| | | | |
|---|---|---|---|
| 2,141,730 | 12/1938 | Van Loon | 329/146 |
| 2,228,858 | 1/1941 | Tellegren et al. | 325/398 |
| 2,240,601 | 5/1941 | Applegarth | 178/7.5 DC |
| 2,910,533 | 10/1959 | Fisher | 178/7.5 DC |
| 3,155,824 | 11/1964 | Rotier | 329/146 X |

*Primary Examiner*—Alfred L. Brody
*Attorney*—Laurence R. Brown

[57] ABSTRACT

A demodulator for television or like signals having modulated and cyclic signals intermixed comprises two cascaded demodulators having respective short- and long-time constants compared to the modulation content and a signal level sensor between the cascaded demodulators responsive to the cyclic signals connected to provide an input signal to the second demodulator.

6 Claims, 1 Drawing Figure

PATENTED MAY 22 1973 3,735,037
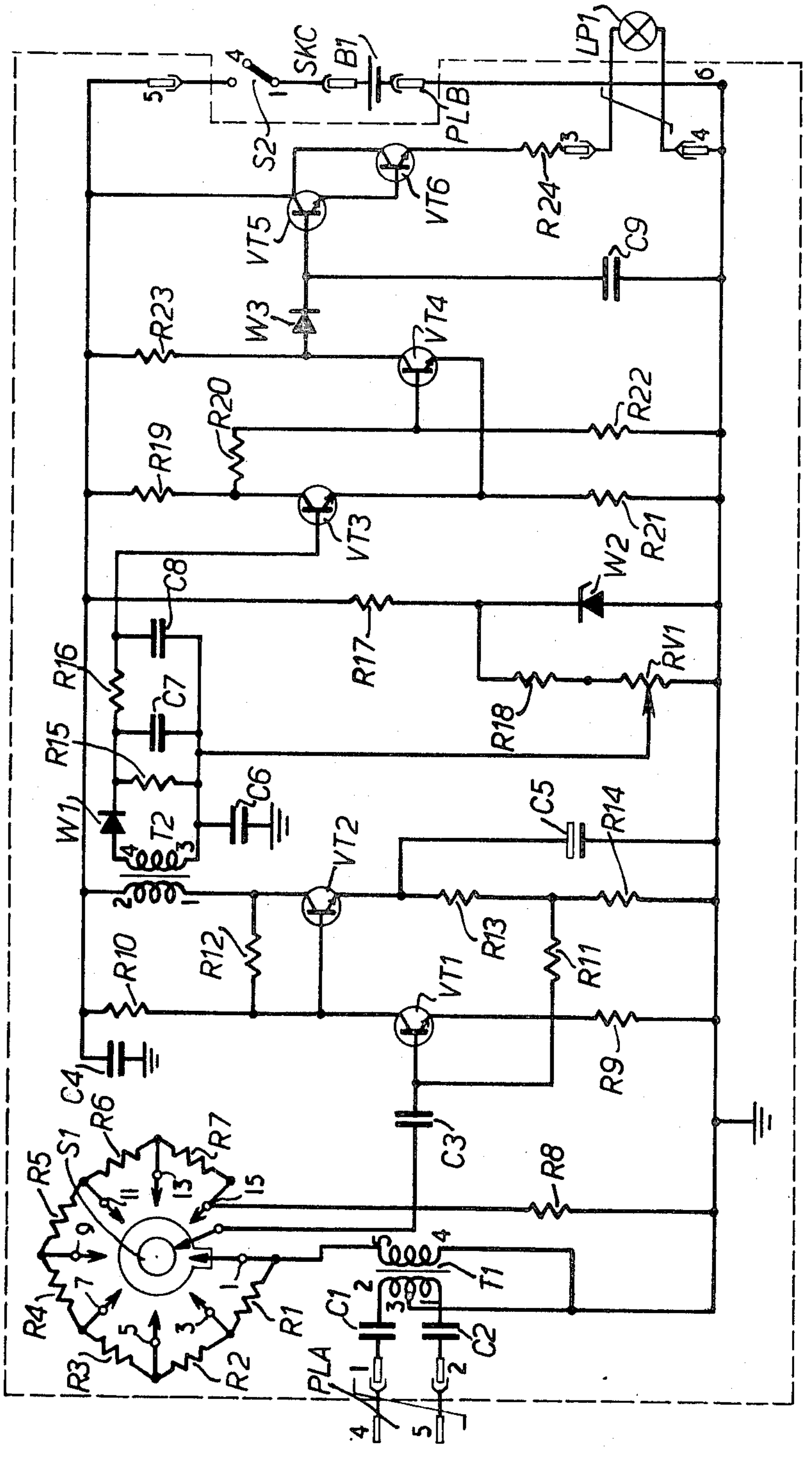

TELEVISION DEMODULATOR WITH SHORT AND LONG TIME CONSTANTS

This invention relates to electric signal responsive devices and seeks to provide an improved form thereof. It is particularly concerned with electric signal responsive devices which are required to respond to electric signals having a wave form which includes repetitive elements having a stable amplitude and other elements having a variable amplitude. A television signal has a wave form of this kind, the repetitive elements of stable amplitude being the synchronizing signals and the other elements being the picture signals. Other signals, such for example as may occur in a pulse modulated communications system, may have similar characteristics.

It is well known that a conventional envelope demodulator will produce in response, for example to a television waveform, an output signal the amplitude of which is largely dependent upon the picture signal content. This renders it difficult to relate in a simple manner the amplitude of the demodulated signal from the demodulator to the amplitude of the applied television signal and renders difficult the provision of level indicators and automatic gain control arrangements for television equipment.

It is an object of the present invention to provide an electric signal responsive device which includes a demodulator arrangement capable of providing an output signal the amplitude of which can be readily related to the amplitude of the signal prior to its demodulation.

Accordingly, the invention provides an electric signal responsive device which includes a demodulator arrangement comprising first and second demodulators connected in cascade, the first demodulator having a load impedance presenting a time constant which is of short duration relative to the modulation content of the signal applied thereto for demodulation and the second demodulator having a load impedance presenting a time constant which is of long duration relative to said modulation content and interposed between said first and second demodulators a signal level sensing means arranged to receive the output signals of said first demodulator and to provide an input signal to said second demodulator in response to signals from said first demodulator which have a predetermined level.

More specifically the invention provides an electric signal responsive device which includes a demodulator arrangement for television signals comprising a first envelope demodulator and a second peak demodulator connected in cascade. The first envelope demodulator has a load impedance presenting a time constant which is of short duration relative to the modulation content of the television signal and the second peak demodulator has a time constant which is of long duration relative to the modulation content of the television signal. Interposed between said first and second demodulators is a signal level sensing means arranged to receive the output signals of said first demodulator and to provide an output signal in response to synchronizing pulses in the modulation content of said television signal for application to the second demodulator.

In an electric signal responsive device which includes a demodulator arrangement of the kind referred to in the preceding two paragraphs an attenuator may be arranged between the first demodulator and a pair of input terminals between which a television signal may be applied and an indicator device may be arranged to be responsive to the presence or absence of an output signal from the peak demodulator.

It will be appreciated that by suitable calibration of the attenuator an assessment may be made of the level of a signal applied between said input terminals by noting the operation of the indicator device relative to the setting of the attenuator.

In order that the invention may be more readily understood one particular embodiment thereof will now be described, by way of example only, with reference to the accompanying drawing which is a circuit diagram of an electric signal responsive device in accordance with the present invention.

The electric signal responsive device shown in the drawing is a level meter for determining the level of television signals which may be present in a high frequency wired broadcasting system operating in the range of 4 – 20 MHz. Television signals the amplitude of which is to be measured are applied between a pair of input terminals 1, 2 between which is connected a center-tapped primary winding of an input transformer T1, said winding having arranged in series therewith DC blocking capacitors C1, C2. The secondary winding of the transformer T1 has one end connected to the common conductor of the device and the other end to the terminal 1 of a multi-position input attenuator comprising the resistors R1 to R8. From this attenuator the input signals are passed through the capacitor C3 to the base of a transistor VT1 which together with the transistor VT2 forms a wideband amplifier. The amplified output signals appear across the primary winding of the transformer T2 the secondary winding of which has associated therewith an envelope detector W1 which has associated therewith a load impedance R15/C7 which presents a time constant of short duration relative to the modulation content of the television signals. The output signals from the detector W1 are passed, via the high frequency attenuating network R16/C8 to the base of the transistor VT3 which together with the transistor VT4 is arranged to form a Schmitt trigger circuit. The output potential of the envelope demodulator W1 is adjusted relative to the common conductor of the equipment by means of the potentiometer RV1 which is arranged across the source of stabilized voltage presented by the zener diode W2. The potential at the wiper of the potentiometer RV1 is adjusted, in operation, to a level such that the Schmitt trigger circuit is triggered by the tips of the synchronizing pulses demodulated by the envelope detector W1. The output signals from the Schmitt trigger circuit which appear across the load resistor R23 are then applied to the second demodulator W3 which has a load impedance formed by the capacitor C9 and the input resistance of the Darlington connected transistor pair VT5, VT6 and which together present a time constant which is of long duration relative to the television signal. The indicator lamp LP1 is arranged in series with the emitter current path of the transistor VT6. This indicator lamp will therefore light when current is passing through the transistor VT6, the current through this transistor being controlled by the output of the second demodulator W3.

In operation the device will accept input signals having an amplitude of between 10 and 100 mV or more. With an input level of 10 mV the signal level across the secondary of the transformer T1 will be about 30 mV and that applied to the input of the first demodulator W1 about 750 mV. The amplitude of the demodulated signal applied to the base of transistor VT3 will be of the order of 100 mV *p—p* and the Schmitt trigger circuit is set, by adjustment of the potentiometer RV1, such that it will be switched from one condition to the other by the tips of the demodulated synchronizing signals. The potential at the collector of transistor VT4 will change from about zero potential to +6V in response to each demodulated synchronizing signal. Thus when the Schmitt trigger circuit is operating in response to the presence of these demodulated synchronizing pulses the output signal from the peak demodulator W3 will have a level of approximately +6V. Conversely, when the Schmitt trigger circuit is inoperative due to the absence of said demodulated synchronizing signals the output signal from the peak demodulator W3 will have a level of about zero potential. Under the latter conditions the transistors VT5 and VT6 will be cut off whilst in the former condition they will be biased 'on' thus causing the lamp LP1 to light. By adjusting the setting of the attenuator S1 to determine the setting at which the lamp LP1 just lights the level of input signal at the terminals 1, 2 may be determined.

What we claim is:

1. An electric signal responsive device which includes a demodulator arrangement comprising first and second demodulators connected in cascade, the first demodulator having a load impedance presenting a time constant which is of short duration relative to the modulation content of the signal applied thereto for demodulation and the second demodulator having a load impedance presenting a time constant which is of long duration relative to said modulation content and interposed between said first and second demodulators a signal level sensing means arranged to receive the output signals of said first demodulator and to provide an input signal to said second demodulator in response to signals from said first demodulator which have a predetermined level.

2. An electric signal responsive device which includes a demodulator arrangement for television signals comprising a first envelope demodulator and a second peak demodulator connected in cascade, the first demodulator having a load impedance presenting a time constant which is of short duration relative to the modulation content of the television signal and the second demodulator having a time constant which is of long duration relative to the modulation content of the television signal and interposed between said first and second demodulators a signal level sensing means arranged to receive the output signals of said first demodulator and to provide an output signal in response to synchronizing pulses in the modulation content of said television signal for application to the second demodulator.

3. An electric signal responsive device as claimed in claim 1, which includes an attenuator between the first demodulator and a pair of input terminals between which signals may be applied to the device and an indicator device responsive to the presence or absence of an output signal from the second demodulator.

4. An electric signal responsive device as claimed in claim 3, which includes an amplifier device between said input terminals and the first demodulator.

5. An electric signal responsive device as claimed in claim 1, wherein the signal level sensing means comprises a bi-stable multi-vibrator.

6. An electric signal responsive device according to claim 3, wherein a direct current amplifier device is arranged to be responsive to output signals from the second demodulator to control the operation of said indicator device.

* * * * *